(12) United States Patent
Erdmann et al.

(10) Patent No.: US 7,617,662 B2
(45) Date of Patent: Nov. 17, 2009

(54) INTEGRATED CROP BAFFLE AND HOLD-DOWN ASSEMBLY USED WITH BALER PICK-UP AND SUSPENSION FOR SAME

(75) Inventors: Jeremy Michael Erdmann, Floris, IA (US); Henry Dennis Anstey, Ottumwa, IA (US)

(73) Assignee: Deere & Company, Moline, IL (US)

( * ) Notice: Subject to any disclaimer, the term of this patent is extended or adjusted under 35 U.S.C. 154(b) by 685 days.

(21) Appl. No.: 11/152,670

(22) Filed: Jun. 14, 2005

(65) Prior Publication Data
US 2006/0277888 A1 Dec. 14, 2006

(51) Int. Cl.
*A01D 43/00* (2006.01)
*A01D 89/00* (2006.01)
(52) U.S. Cl. .......................................... 56/190; 56/364
(58) Field of Classification Search .................... 56/191, 56/119, 190, 219–225, 400
See application file for complete search history.

(56) References Cited
U.S. PATENT DOCUMENTS

| | | | | |
|---|---|---|---|---|
| 931,982 | A * | 8/1909 | Anderson | 474/185 |
| 1,819,432 | A * | 8/1931 | Mickle | 56/364 |
| 2,787,913 | A * | 4/1957 | Hageline | 474/185 |
| 2,872,772 | A * | 2/1959 | Nolt | 56/364 |
| 3,924,391 | A * | 12/1975 | Cheatum | 56/364 |
| 4,015,410 | A * | 4/1977 | Smith | 56/364 |
| 4,411,127 | A | 10/1983 | Diederich, Jr. et al. | |
| 4,720,962 | A | 1/1988 | Klinner | |
| 4,841,718 | A * | 6/1989 | Sund | 56/364 |
| 5,195,402 | A * | 3/1993 | McMillen et al. | 74/665 GC |
| 5,293,732 | A * | 3/1994 | Vogelgesang et al. | 56/16.4 R |
| 5,333,516 | A * | 8/1994 | Edwards et al. | 74/665 GC |
| 5,369,944 | A * | 12/1994 | Robichaud | 56/330 |
| 5,797,250 | A * | 8/1998 | Augie | 56/10.2 J |
| 6,688,092 | B2 | 2/2004 | Anstey et al. | |
| 6,810,650 | B2 * | 11/2004 | McClure | 56/190 |
| 6,874,311 | B2 * | 4/2005 | Lucand et al. | 56/341 |
| 6,877,304 | B1 * | 4/2005 | Smith et al. | 56/364 |
| 2001/0036888 | A1 * | 11/2001 | Franke | 492/16 |
| 2006/0162103 | A1 * | 7/2006 | Kallman et al. | 15/82 |

OTHER PUBLICATIONS

European Search Report, Oct. 5, 2006, 5 Pages.

* cited by examiner

*Primary Examiner*—Thomas B Will
*Assistant Examiner*—Joan D Misa (57) ABSTRACT

A large round baler includes a crop pick-up having a tined reel for lifting a windrow of crop to a secondary feeder which moves the crop into the baling chamber. Crop feeding is aided by an integrated crop baffle and hold-down assembly suspended from the baler frame for vertical floating movement by a trailing four-bar linkage arrangement. The baffle is located ahead of the pick-up tine reel, and the compressor rods extending rearwardly over the reel from a location close to an upper rear region of the baffle to a region beneath a bale starter roll. The linkage arrangement controls the movement of the integrated crop baffle and hold-down assembly such that the assembly quickly adjusts to varying windrow thickness, and so that interference between the starter roll and the rear sections of the crop hold-down compressor is avoided.

23 Claims, 8 Drawing Sheets

INTEGRATED CROP BAFFLE AND HOLD-DOWN ASSEMBLY USED WITH BALER PICK-UP AND SUSPENSION FOR SAME

FIELD OF THE INVENTION

The present invention relates to an integrated crop baffle and hold-down assembly for controlling crop for being picked up by a pick-up reel, and to a suspension for such an assembly.

BACKGROUND OF THE INVENTION

U.S. Pat. No. 6,688,092 discloses a baler having a main frame to which is coupled a crop pick-up. An integrated crop baffle and hold-down assembly is provided for controlling crop being picked up by the tined reel of the pick-up. The integrated baffle and hold-down assembly is suspended for floating over a crop windrow by a suspension including a trailing link arrangement having a rear end pivotally attached to each end of the baffle and including a front end having a lost motion slot received on a guide pin fixed to the baler frame. Each of opposite ends of the pick-up is provided with a flare sheet mounted for pivoting about the pick-up reel axis and carrying a guide pin located within a fore-and-aft extending guide slot provided in a bracket carried by the baler frame. Mounted between each end of the baffle and the latter named guide pin is a flexible cable which establishes a minimum clearance between the baffle and the pick-up reel. The crop hold-down arrangement includes a plurality of compressor rods mounted in spaced relationship to each other across the top of the baffle, the rods being curved above the path traced by the pick-up tines and terminating at a location between a crop feed rotor and a bale starter roll.

For the most part, the above-described patented integrated crop baffle and hold-down assembly performs excellently. However, the assembly has the limitations of requiring rather exacting tolerances on several of the suspension components in order to maintain proper orientation of the compressor rods, which, even if properly oriented, sometimes contact the bale starter roll. Another limitation is that the linkage between the pick-up and the baffle for causing the baffle to be lifted with the pick-up tends to carry significant loads from crop flow which can pull on the baffle.

SUMMARY OF THE INVENTION

According to the present invention, there is provided an improved integrated crop baffle and hold-down assembly with suspension which represents an improvement over the structure disclosed in U.S. Pat. No. 6,688,092.

An object of the invention is to provide a suspension for an integrated crop baffle and hold-down assembly which controls the rear tips of the compressor rods in a relatively small zone away from the bale starter roll while allowing the baffle to move up and forward to allow the largest of windrows to pass under while permitting windrows of lesser size to pass under it with minimal restriction.

This and other objects will become apparent from a reading of the ensuing description together with the appended drawings.

DESCRIPTION OF THE PREFERRED EMBODIMENT

Figure 1:
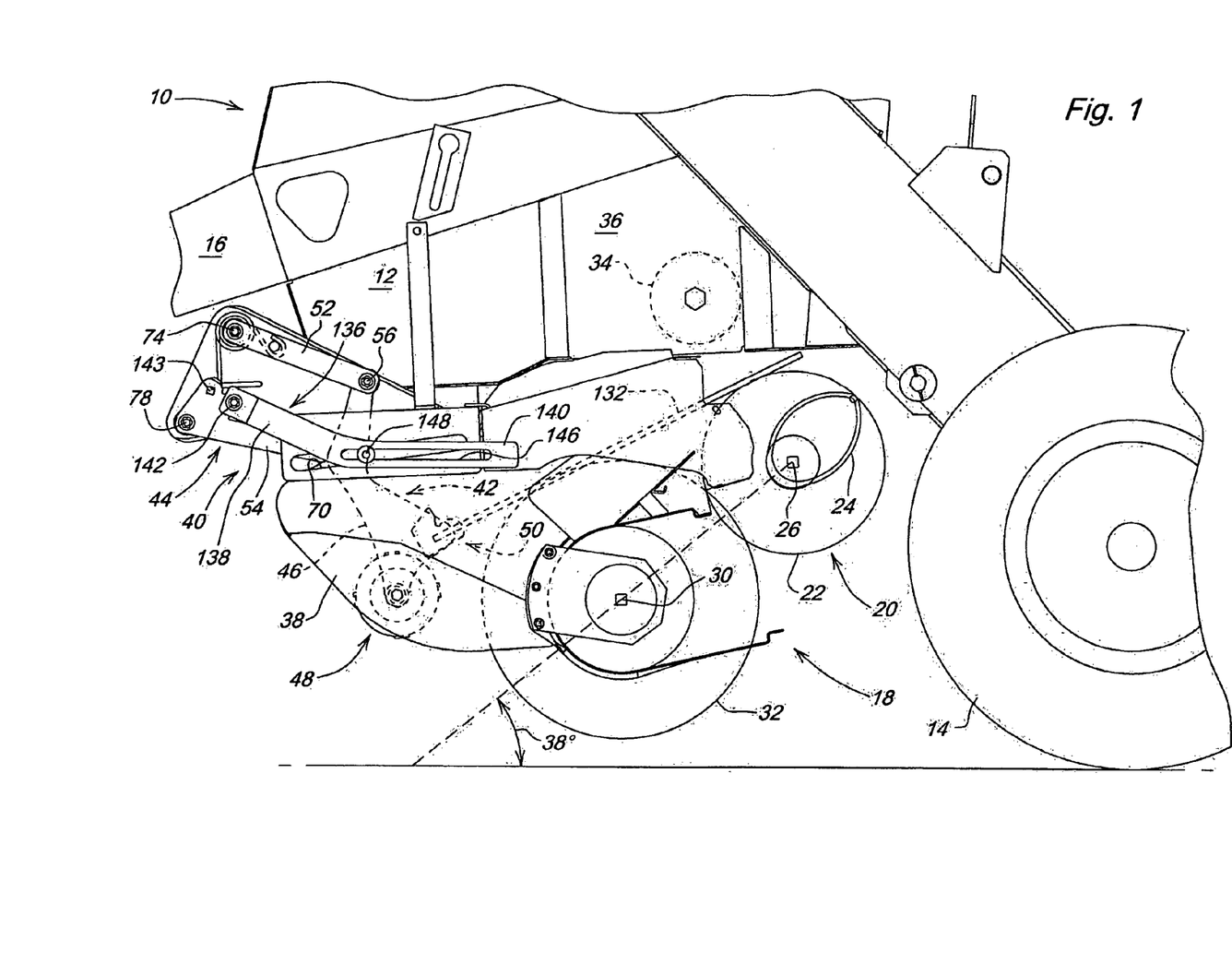
FIG. 1 is a somewhat schematic left side elevational view of a forward end portion of a baler having a pick-up equipped with an integrated crop baffle and hold-down assembly constructed in accordance with the present invention, with the pick-up being shown in a lower, working position.
Figure 2:
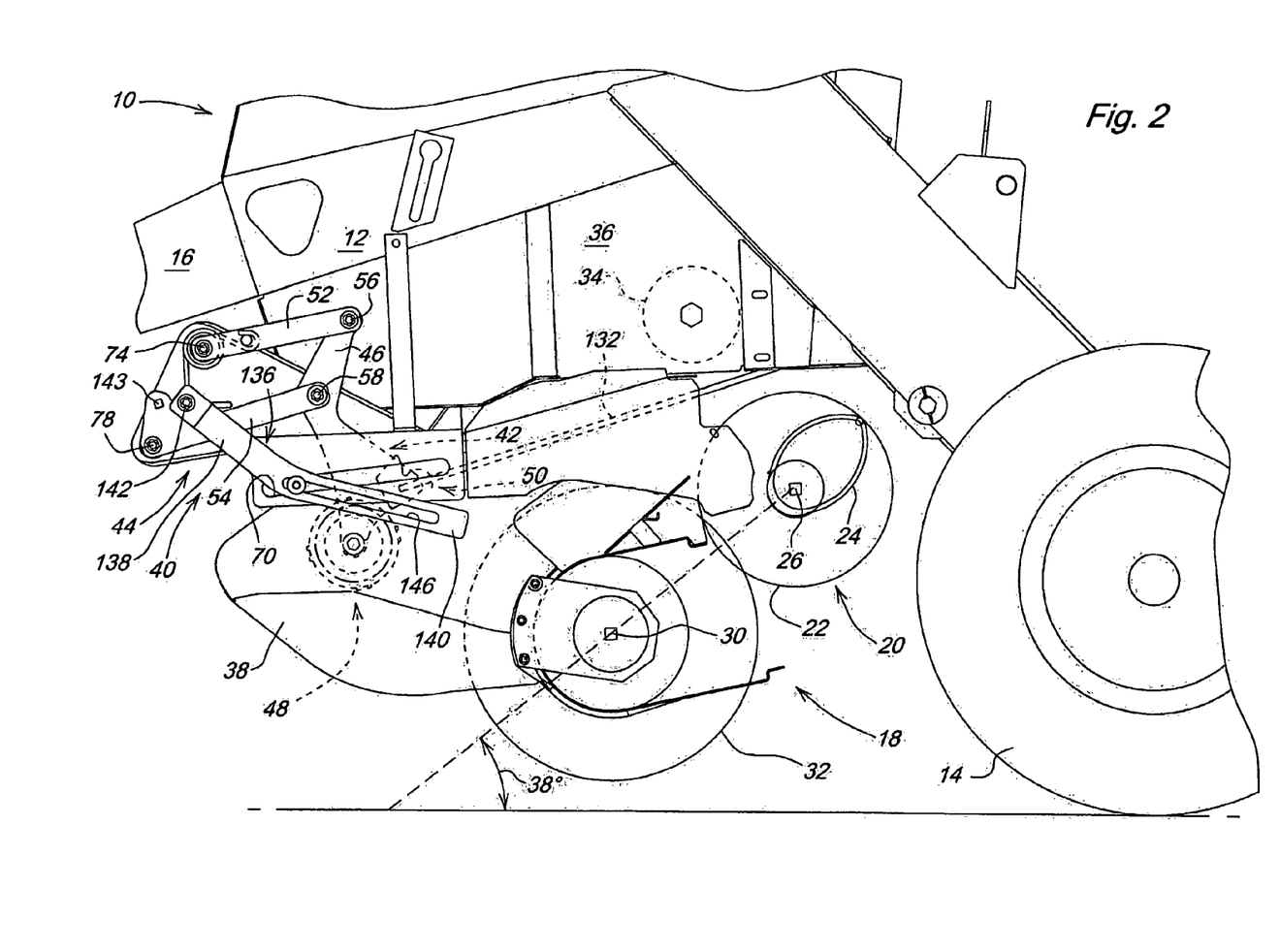
FIG. 2 is a view showing the pick-up in a position wherein it has floated upwardly from its lower, working position during operation.
Figure 3:
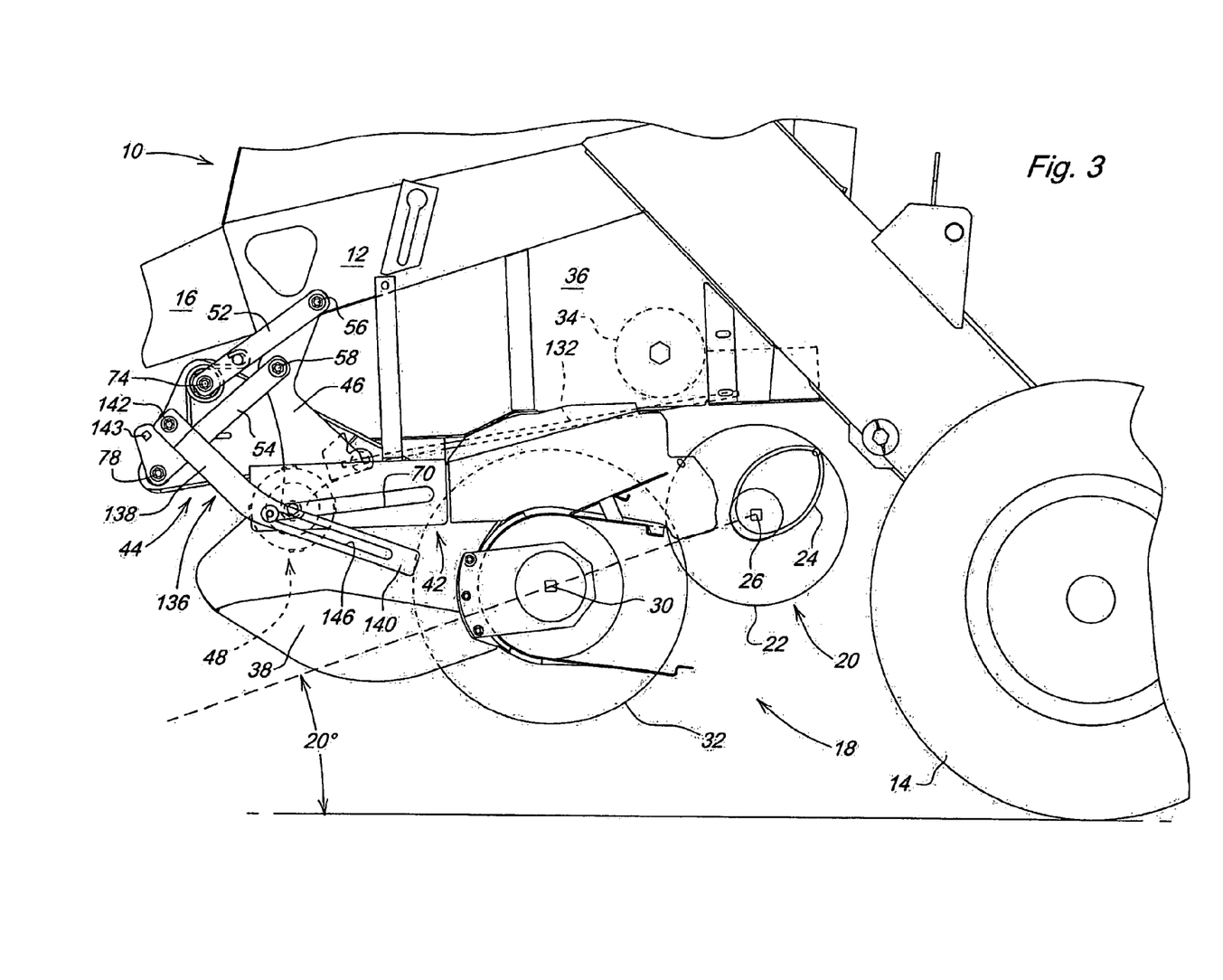
FIG. 3 is a view showing the pick-up in a fully-raised transport position.

Referring now to FIGS. 1-3, there is shown a forward end portion of a baler 10 including a main frame 12 supported on ground wheels 14 adapted for being towed over the ground by a tractor (not shown) hitched to a tongue 16 projecting forwardly from the frame 12.

Mounted to the frame 12 in a location forward of the wheels 14 is a crop gathering assembly including a pick-up 18 and a rotary conveyor 20. The pick-up 18 is substantially wider than the baling chamber of the baler 10, and, in order to narrow the crop flow to a width commensurate with that of the baling chamber, opposite ends of the rotary conveyor 20 are respectively defined by stub augers (not shown), while the region of the rotary conveyor 20 between the stub augers is provided with a set of rotor teeth (not shown) having outer ends that each trace a circular path 22, with each tooth passing between adjacent football-shaped strippers 24 as the rotary conveyor 20 rotates clockwise, as viewed in FIGS. 1-3, about a horizontal transverse axis 26.

The pick-up 18 includes a frame 28 mounted to the frame 12 for pivoting about the axis 26. A center shaft of a pick-up tine reel (not shown) is mounted to the frame 28 for rotating about a horizontal transverse axis 30, with tips of the tines each describing a circular path 32. Thus, as the reel rotates clockwise, the tines act to pick-up a windrow of crop material and deliver it to the rotary conveyor 20, which, in turn, delivers the crop into a baling chamber inlet defined between a horizontal transverse bale starter roll 34, extending between and mounted to side walls 36 of a fixed front section of the baling chamber, and a lower front gate roll (not shown) carried by a discharge gate of the baler, as is well known. Flare sheets 38 are mounted at opposite sides of the pick-up frame 28 for pivoting about the axis 30, with a portion of the left-hand flare sheet being broken away so as to reveal part of the present invention, as will be apparent from the ensuing description.

Suspended from the baler main frame 12 at a location forward of the pick-up 18 is a crop controlling arrangement 40 including an integrated crop baffle and crop hold-down assembly 42 and a suspension assembly 44.

Figure 4:
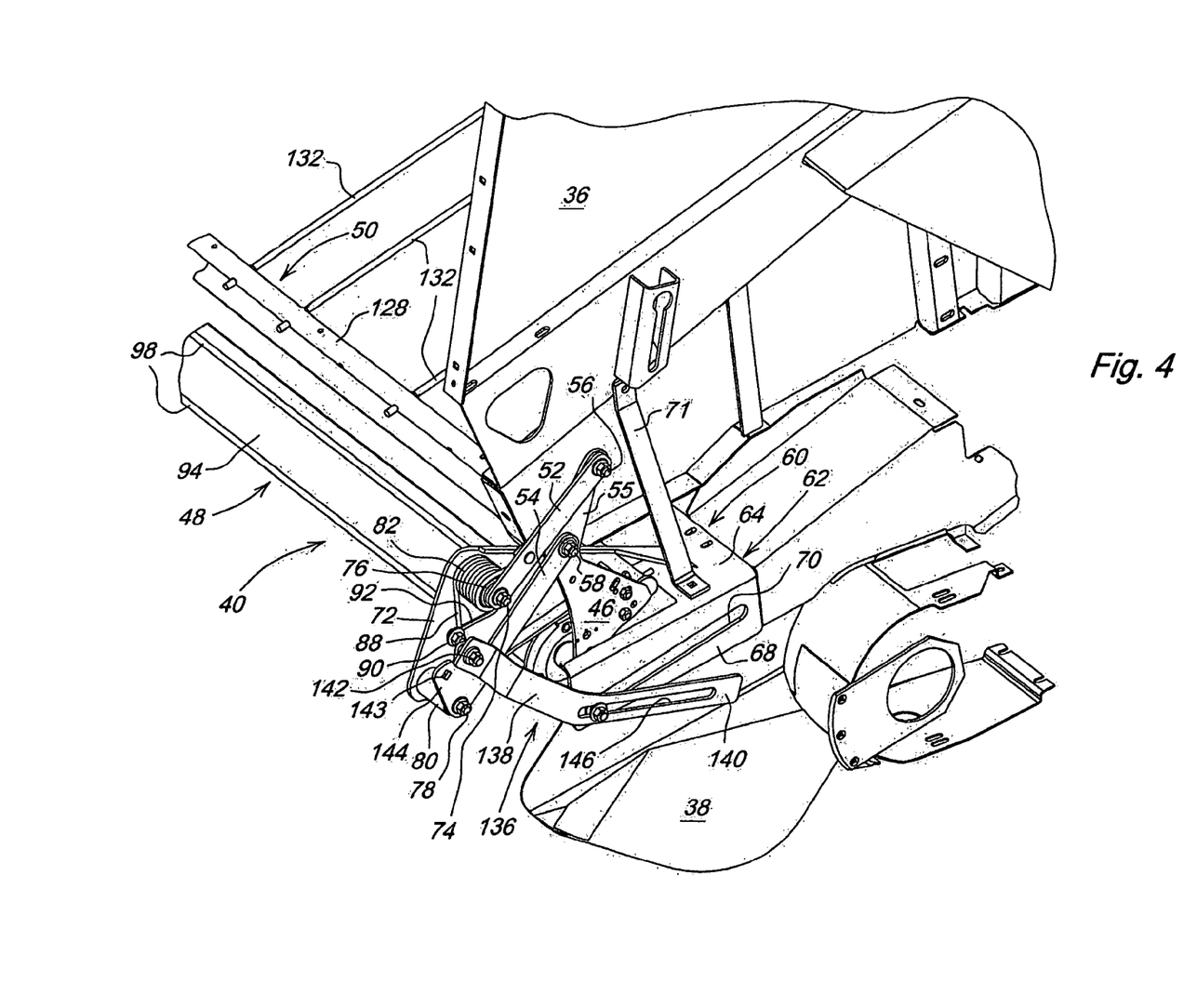
FIG. 4 is a top left front perspective view showing the connection between the left end of the integrated crop baffle and hold-down assembly of FIG. 1 and the baler frame.
Figure 5:
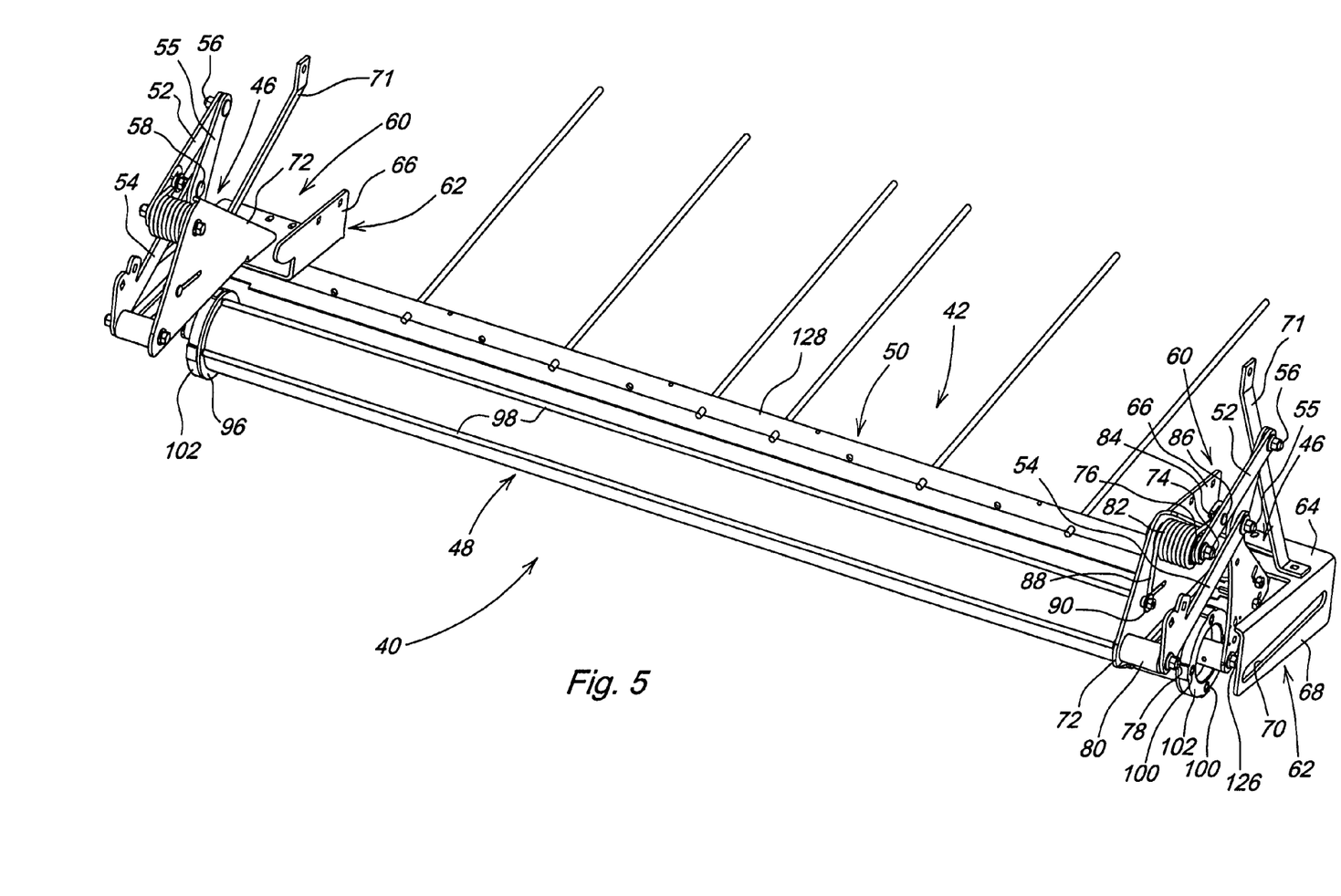
FIG. 5 is a left front perspective view of the integrated crop baffle and hold-down assembly of FIG. 1 and the mounting brackets that form part of the baler frame.
Figure 6:
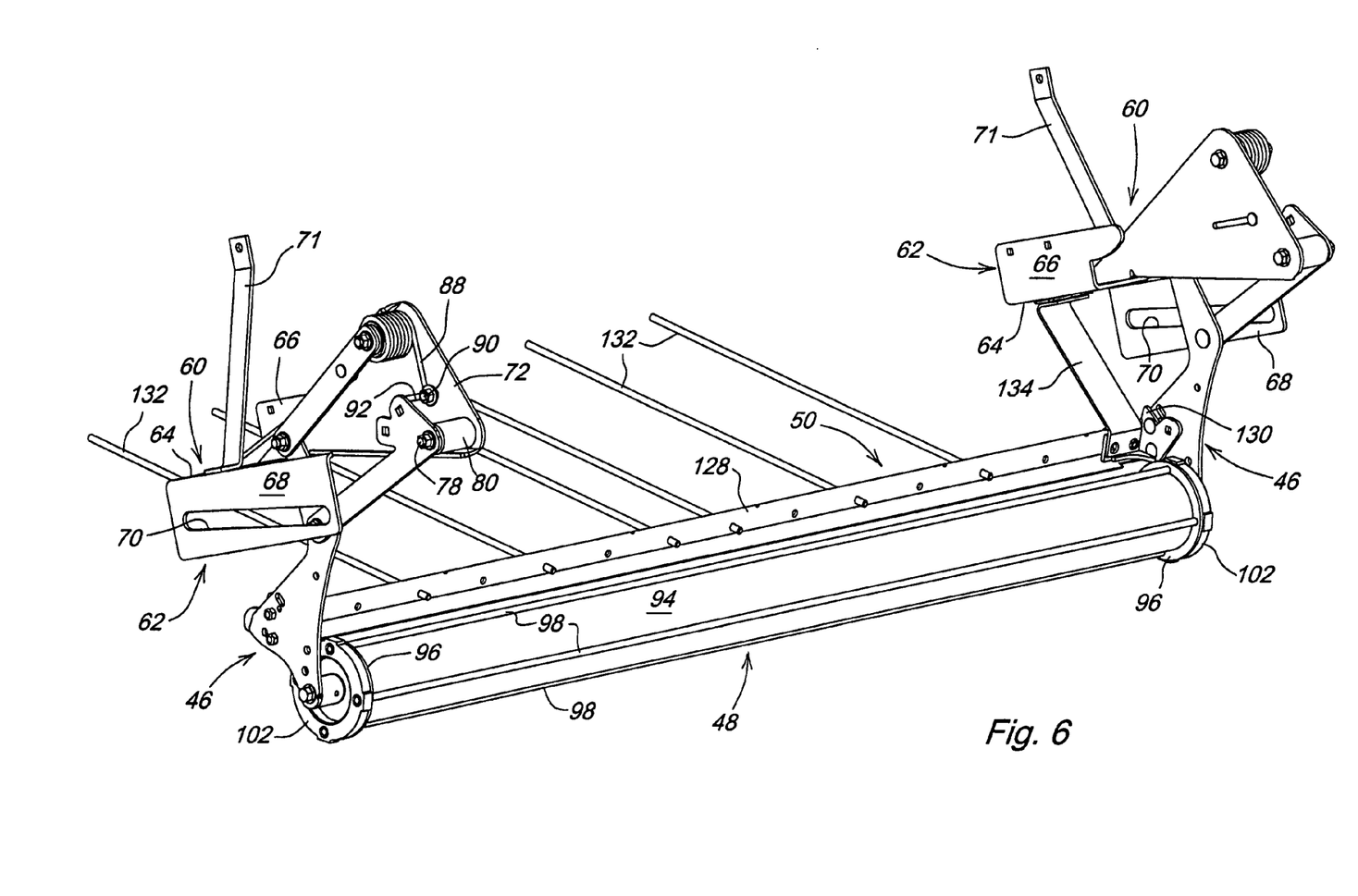
FIG. 6 is a right front perspective view of the structure shown in FIG. 5, but from a lower view point

Referring now also to FIGS. 4, 5 and 6, it can be seen that the integrated crop baffle and crop hold-down assembly 42 includes a pair of transversely spaced, upright support plates 46 respectively having lower front corners serving as the mounting locations for opposite ends of a crop baffle arrangement 48, in the form of a roller, and respectively having lower rear corners, spaced upward and to the rear from the lower front corners, serving as the mounting locations for opposite ends of a crop hold-down arrangement 50.

The suspension assembly 44 includes generally parallel, upper and lower pairs of links 52 and 54, respectively, having rear ends pivotally coupled to respective upper regions 55 of the support plates 46, the upper regions 55 making up approximately half of a total height dimension of the support plates 46. Specifically, the upper pair of links 52 have rear ends respectively pivotally connected, as by bolts 56, to upper ends of the support plate upper regions 55 at locations spaced above, and in approximate vertical alignment with, the lower front ends of the plates 46, and hence, with the opposite ends of the crop baffle arrangement 48. The lower pair of links 54 have rear ends respectively pivotally connected, as by bolts 58, to locations of the support plate upper regions 55, which are spaced down and forward from the mounting locations at the tops of the regions 55.

A mounting bracket arrangement 60 is provided at each side of the baler frame 12 for providing support for the suspension assembly 44. As can best be seen in FIG. 5, each mounting bracket arrangement 60 includes a main bracket 62 constructed from a formed plate including a horizontal section 64 extending between, and joined to, an upwardly projecting vertical inner section 66, that is bolted to the adjacent frame side wall 36, and a downwardly projecting vertical outer section 68 containing a horizontal slot 70 having a purpose explained below. Additional support is provided for the brackets 62 by respective metal straps 71 having vertical upper end sections respectively bolted to the walls 36, and having respective horizontal lower end sections bolted to outer regions of the bracket horizontal sections 64, with the straps 71 being angled outwardly from the walls 36. Welded to an outer surface of a forward region of, and forming a forward extension of, each of the bracket vertical sections 66 is a linkage support plate 72. The support plates 72 have respective enlarged forward end regions spaced upward and forward relative to the baffle arrangement 48. Thus, the upper suspension links 52 extend forwardly from the top of the support plate upper regions 55 and have their forward ends respectively pivotally connected, as by bolts 74, to the support plates 72, with a cylindrical spacer 76 being received on each bolt 74 at a location between the associated support plate 72 and link 52. Similarly, the lower suspension links 54 have their forward ends respectively pivotally connected, as by bolts 78, to the support plates 72, with a cylindrical spacer 80 being received on each bolt 78 at a location between the associated support plate 72 and link 54. Thus, a four-bar linkage is defined by the pairs of links 52 and 54 and the support plates 46 and 72. Other multi-bar linkages could be used as well so long as the desired movement of the baffle arrangement 48 results.

A counter balance arrangement for exerting a lifting force for balancing the weight of the baffle arrangement 48, the hold-down arrangement 50, the support plates 46 and the suspension links 52 and 54 is provided in the form of a pair of coil springs 82 respectively received on the spacers 80, with outer ends of the spring coils terminating in straight sections having a back-turned ends 84 respectively captured by bolts 86 provided in the upper links 52, and with inner ends of the spring coils terminating in straight sections 88 respectively abutting against rear sides stops 90 respectively mounted for adjustment along a fore-and-aft oriented slots 92 provided in the support plates 72. While the torsion springs 82 are used in the preferred counter balance construction because of the compactness of the assembly, it should be understood that counter balance may be provided by any other elastic component including compression or extension springs, rubber components, or gas springs.

Figure 7:
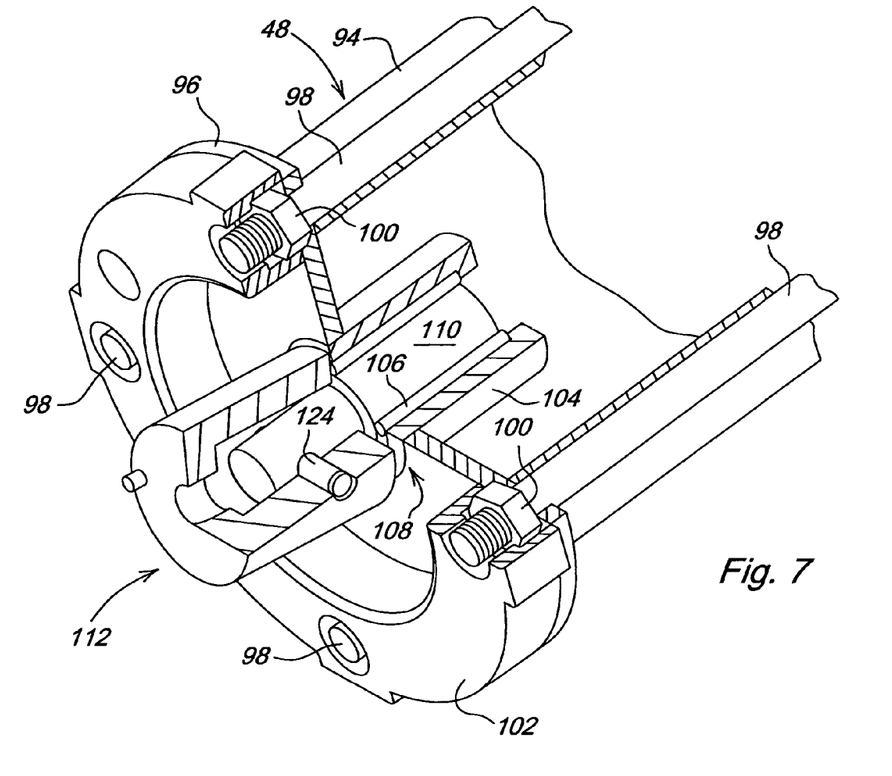
FIG. 7 is a partial sectional, left rear perspective view of the left end of the crop baffle roller assembly forming part of the crop controlling arrangement.

Referring now to FIG. 7, it can be seen that the roller which forms the baffle arrangement 48 includes a cylindrical tube 94 having opposite ends covered by circular end plates 9 clamped against the opposite ends of the tube through the action of four tie rods 98 spaced angularly about the tube 94 at equal distances from each other, with each rod 98 projecting through axially aligned holes provided in the end plates 96 and fixed in place by nuts 100 received on threaded opposite ends of the rods 98. Located over each set of four nuts 100 at the opposite ends of the tube 94 is a ring-shaped cover 100 containing openings in which the nuts 100 are received. The cover 102 may be made of plastic and designed to be snap fit over the nuts 100, and/or provided with openings for receiving screw fasteners (not shown) that extend through the openings into aligned threaded openings provided in the end plates 96. It is to be noted that while a cylindrical roller is preferred, other tubular shapes could be used.

Figure 8:
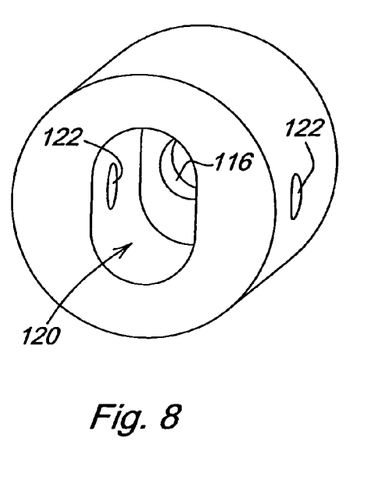
FIG. 8 is a perspective view of one of the couplings used for connecting the baffle roller stub shaft to the support for the baffle float linkage.
Figure 9:
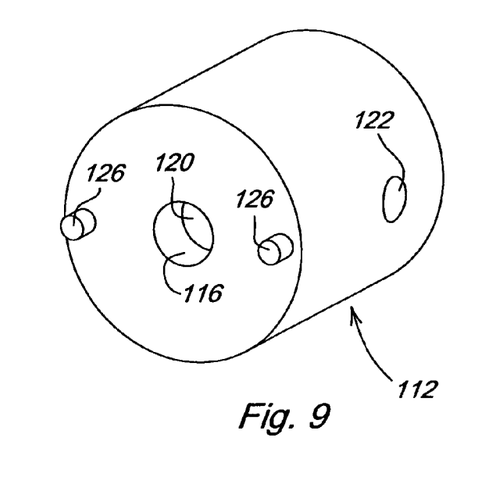
FIG. 9 is a perspective view directed towards the opposite end of the coupling shown in FIG. 8.

Fixed in axial alignment with, and to an inner surface of, each of the end plates 96 is a cylindrical tubular bearing housing 104 having an annular, inwardly projecting, bearing retainer lip 106 at its inner end. A bearing assembly 108 is located in the bearing housing 104. A support shaft 110 is received in each bearing assembly 108, thereby providing a support about which the baffle tube 94 may rotate. The support shafts 110 are each coupled to the lower ends of the support plates 48 by cylindrical couplers 112. Referring also to FIGS. 8 and 9, it can be seen that outer ends of the couplers 112 each include a threaded opening 116 receiving a threaded end of a fastening bolt 118 which extends through the lower end of the associated support plate 46. Each cylindrical coupler 112 is provided with a cavity 120 extending axially from an inner end of the coupler 112, as viewed in FIG. 7, and terminates short of the outer end of the coupler. The cavity 120 is substantially elliptical in cross section and is oriented so as to have its largest cross sectional dimension oriented vertically. A horizontal cross bore 122 extends diametrically through the coupler 112 and intersects the largest dimension of the cross section of the cavity 120 at a right angle. The shafts 110 at the opposite ends of the baffle arrangement 48 are respectively received in the cavities 120 of the couplers 112 and retained there by roll pins 124 respectively received in the cross bores 122 and in respective aligned bores provided in the shafts 110. The purpose of the cavities 120 is to permit relative vertical pivotal movement between the couplers 112 and the shafts 110 so that one end of the baffle arrangement 48 may raise or lower relative to the other when moving over the top of a windrow, for example. In order to keep the couplers 112 oriented properly for such relative vertical pivoting, a pair of diametrically opposite locator pins 126 are provided in each of the outer ends of the couplers 112 in co-planar relationship to the cross bores 122, and each of the support plates 46 is provided with a pair of holes which receive the locator pins 126 (see FIG. 5). Further, it is noted that the couplers 112 are considerably less in diameter than the baffle end plates 96 and covers 102, resulting in an increase in the range of vertical movement of the baffle arrangement 48 without there being interference with the baler frame 12. While the preferred construction of the baffle arrangement 48 is that of a roller, non-rolling configurations could be used with advantage as well.

Referring now back to FIGS. 4, 5 and 6, it can be seen that the hold-down assembly 42 includes a tubular compressor rod mounting bar 128 extending transversely between, and fixed to opposite end plates 130 which are respectively engaged with, and bolted to, inner surfaces of lower rear locations of the support plates 46. The tubular bar 128 is located to the rear and at a height slightly above that of the baffle arrangement 48, when the crop controlling arrangement 40 is in a working range as illustrated in FIGS. 1 and 2. Spaced transversely from each other and mounted to a middle region of the tubular bar 128, so as to be inwardly of crop converging stub augers (not shown) at the opposite ends of the crop feed rotor 20, are a plurality of substantially straight, elongated compressor rods 132. While the compressor rods 132 is a preferred crop compressing arrangement, alternate compressing arrangements could be defined by a solid compressor sheet, multiple compressor strips, or, any combination of compressor rods, sheet, and strips.

As can best be seen in FIGS. 1-3, the rods 132 extend rearwardly from the bar 128 over the pick-up reel and have rear end regions that terminate in a zone between the crop feed rotor 20 and the starter roller 34. It is to be noted that as the integrated baffle and crop hold-down arrangement 42 floats vertically, during normal operation, between its lower position, shown in FIG. 1, and its upper position, shown in FIG. 2, the suspension assembly 44 controls the hold-down arrangement 50 such that the rear sections of the compressor rods 132 only rise a small amount.

The suspension assembly 44 further includes a pair of flexible supports 134, here shown constructed from segments of rubber belting used for forming bales in the baling chamber. These belting segments have a width sufficient for affording stiffness in the sideways direction while permitting vertical flexing and in this way prevent excessive side-to-side movement of the integrated baffle and crop hold-down arrangement 42 while permitting the arrangement 42 to float vertically. The upper ends of the supports 134 are respectively fastened, as by bolts (not shown) against rear under surface locations of the horizontal sections 64 of the main brackets 62, while the lower ends of the supports 134 are respectively fastened, as by bolts (not shown) to forward surface locations at opposite ends of the tubular compressor rod mounting bar 128. Since the supports 134 are at the ends of the bar 128, they are in fore-and-aft alignment with the space outward of opposite ends of the baffle arrangement 48 so that they at least fill in part of the void existing beyond the ends of the baffle arrangement 48 and aid to control crop.

Also forming part of the suspension assembly 44 is a lift linkage arrangement including a pair of lift links 136 having a front section 138 joined to a rear section 140, which is slightly longer than the front section 138, so as to define an included angle of approximately 160°. The front sections of the links 136 have respective inwardly offset forward ends pivotally coupled, as by bolts 142, at rear ones of a pair of holes 143 provided in ears 144 forming part of forward regions of the lower suspension links 54. The rear sections 140 of the links 136 contain respective slots 146 respectively disposed in overlapping relationship to the slots 70 contained in the outer vertical sections 68 of the main brackets 62. A fastener 148 is received in each set of overlapping slots 70 and 146 and in a hole provided in the adjacent flare sheet 38, which results in the rear ends of the links 136 being guided along the slots 70 in response to vertical pivotal movement of the pick-up about the rotary conveyor axis 26. Thus, with reference to FIG. 1, it can be seen that each fastener 148 is located approximately halfway between opposite ends of the associated slot 70, and is located a short distance to the rear of the front end of the associated slot 146. As the tined reel section of the pick-up floats upwardly to the position shown in FIG. 2, the fasteners 148 move forward in the slots 70 and abut against the front ends of the slots 146, but do not impart a lifting force to the links 136. When it is desired to fully lift the pick-up, as for transport for, example, a hydraulic actuator (not shown) is used to pivot the pick-up reel clockwise about the conveyor rotor pivot axis 26 to the position shown in FIG. 3. Once the pick-up reel moves past the position shown in FIG. 2, the fasteners 148 are moved forward to the ends of the slots 70 and during this movement impart a forwardly directed force on the links 136, which is transferred on to the lower suspension links 54 at the bolts 142, causing the links 54 to pivot counterclockwise about the bolts 78 resulting in a lifting force being exerted on the support plates 46, thereby effecting vertical movement of the baffle arrangement 48 and hold-down assembly 50. A slightly different operating characteristic can be obtained by selecting the forward mounting holes 143 for the attachment of the lift links 136.

Figure 10:
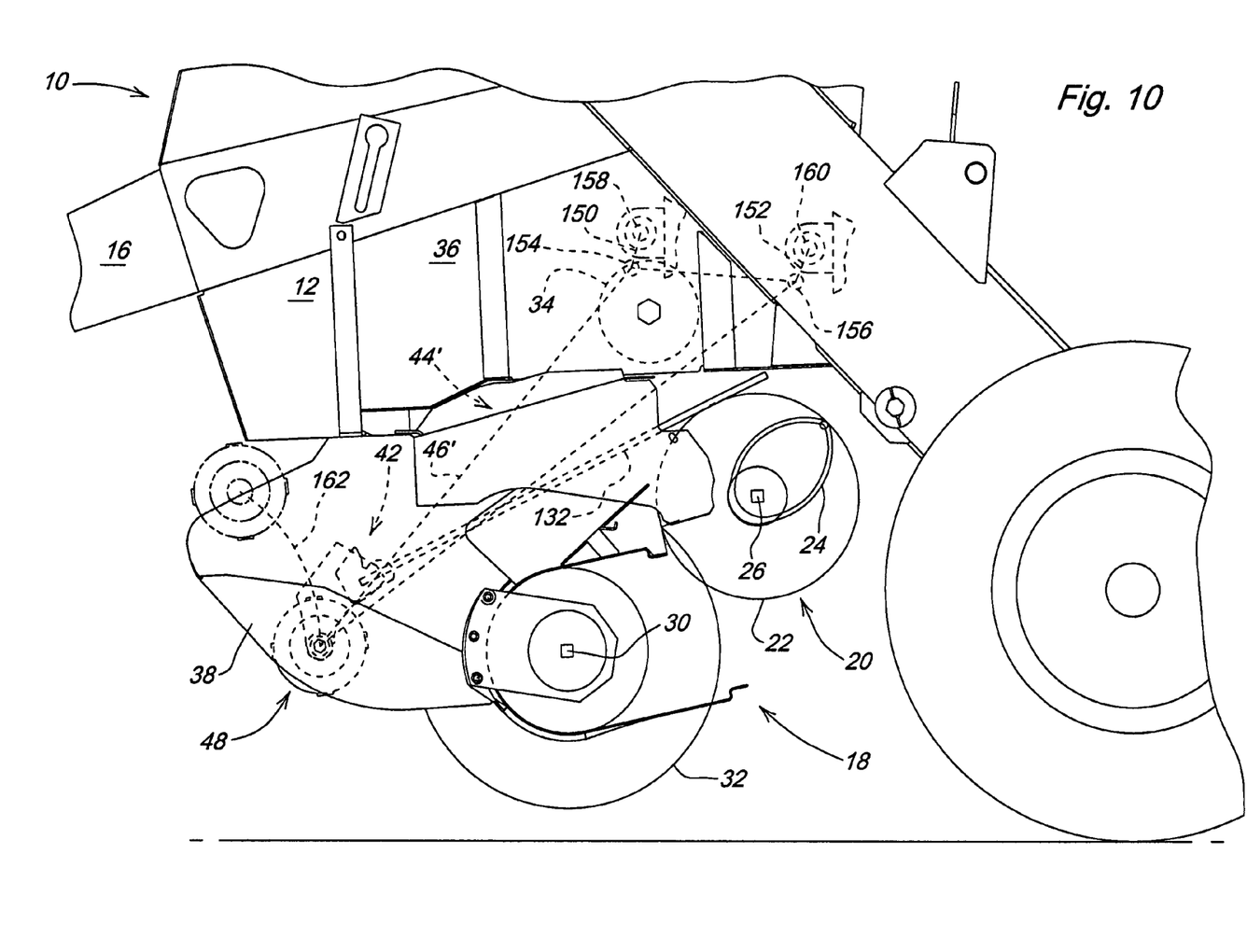
FIG. 10 is a schematic left side view showing an alternate embodiment of the baffle support linkage, wherein its attachment with the baler frame is rearward of the baffle.

A second embodiment of the suspension assembly is illustrated at 44' in FIG. 10 and includes a pair of transversely spaced, vertical triangular support plates 46' between a forward corner of which the crop baffle arrangement 48 extends and is supported for rotation by the cylindrical couplers 112. Associated with each of the triangular support plates 46' are a pair of relatively short, substantially parallel, front and rear links 150 and 152, respectively, having lower ends attached, as at pivot connections 154 and 156, to the remaining corners of the associated support plate 46'. Upper ends of the front and rear links 150 and 152 are respectively coupled to the baler frame 12 at pivot connections 158 and 160. When the baffle arrangement 48 is located in a lowered, working position, as shown in FIG. 10, crop windrows will be lifted and fed through the gap between the circular path 32 of the tined reel of the pick-up 18 and the baffle arrangement 48. When a relatively thick section of windrow is fed through the gap, the crop will cause the baffle arrangement 48, to be lifted upwardly and forwardly relative to the reel of the pickup, with the suspension assembly 44' acting to guide the baffle arrangement along a generally arcuate path 162 having an instant center located forward of the baffle arrangement 48 and being substantially the same as the path traced by the baffle arrangement 48 when coupled to the above-described suspension assembly 44 that is pivotally coupled to the frame 12 at a location ahead of the baffle arrangement 48.

The operation of the crop controlling arrangement 40, as illustrated in FIGS. 1-9, is briefly stated as follows. Assuming the baler 10 to be operating in a field, the pick-up 18 will be lowered to its working position, shown in FIG. 1 and drawn along a windrow of crop to be baled. The baffle arrangement 48 will then be in engagement with and roll along the top of the windrow. The counter balance spring 82 will be adjusted so that a selected portion of the weight of the suspended mass of the crop controlling arrangement 40 will keep the baffle arrangement 48 in contact with the windrow.

The tined reel of the pick-up 18 will be driven so that the tines move clockwise about the axis 30, with tips of the tines moving along the path 32 so as to engage and lift the windrow of crop and feed it rearwardly to the rotary conveyor 20, which delivers the crop below the bale starter roll 34, which forms a top border of the inlet to the baling chamber. The baffle arrangement 48 aids the feeding of crop by preventing it from being thrown forward by the action of the pick-up tines, while the compressor rods of the hold-down assembly 50 act to keep the crop engaged with the tines and then with the feeding elements of the rotary conveyor 20.

When areas of windrows of uneven thickness are encountered, the suspension arrangement 44 permits the integrated crop baffle and hold-down arrangement 42 to float in quick response to the variations in crop thickness so as not to restrict crop flow. This quick response is achieved in a significant part by the four-bar linkage arrangement defined by the nearly parallel pairs of links 52 and 54, and the mounting plates 46. It is noted that the disposition of the links 52 and 54 and their relative lengths results in the baffle arrangement 48 being maintained at a minimum clearance from the path 32 of the reel tine and moving upwardly and forwardly from the path 32 in response to increasing windrow thickness. Further, the geometry of the links relative to the compressor rods 132 results in the rear end sections of the rods 132 being controlled so that they remain spaced from the starter roll throughout the full vertical movement of the arrangement 42. In addition, the disposition of the four-bar linkage is such that crop forces imposed against the forward side of the baffle arrangement 48 will result in the baffle arrangement 48 being lifted so that rearward forces on the baffle arrangement are minimized. The fact that the baffle arrangement 48 is defined in part by a roller also contributes to minimize the effect of forces imposed at the front of the baffle arrangement 48 since some of these forces will be disposed so as to merely rotate the baffle arrangement.

In the event side-to-side unevenness in the windrow is encountered, the baffle arrangement 48 will still remain engaged with the windrow due to the pivotal connection between the couplers 112 and the shafts 110 and the elliptical cross section openings 120 in which the shafts 110 are received. It is noted here that the flexible suspension members 134 resist sideways shifting movement of the integrated crop baffle and hold-down assembly 42 due to the sideways stiffness of the belt segments from which the suspension members 134 are constructed.

The operation of the embodiment illustrated in FIG. 10 is quite similar to that just described and for the sake of brevity is not stated here, with it to be noted however that the multi-bar suspension in FIG. 10 is a leading suspension as opposed to the trailing suspension of the embodiment shown in FIG. 1. In both cases, the baffle arrangement 48 moves upwardly and forwardly in response to a windrow of increasing thickness passing between the pick-up reel and the baffle arrangement 48.

Having described the preferred embodiment, it will become apparent that various modifications can be made without departing from the scope of the invention as defined in the accompanying claims.

The invention claimed is:

1. In combination with a crop processing implement including a main frame supported on ground wheels and a crop windrow pick-up coupled to the main frame for pivoting vertically and having tines supported for sweeping a path that carries them into engagement with a crop windrow for elevating the windrow into the implement for further processing, a crop control arrangement including a transverse baffle arrangement including a baffle located ahead of said path for engaging the top of a windrow being picked up, a suspension arrangement coupled between said baffle and said frame for maintaining said baffle at a minimum clearance from said path while permitting said baffle to move up and down in response to variations in thickness of said windrow, the improvement comprising: said suspension arrangement including a lift linkage arrangement coupled between said frame and said pick-up and being constructed for sensing changes in position of said pick-up and providing an input to a remaining portion of said suspension arrangement so as to cause said baffle to move upwardly and forwardly relative to said path in response to increasing elevation of said pick-up.

2. The combination, as defined in claim 1, wherein said suspension arrangement includes a multi-bar linkage is coupled between said baffle and said frame such as to establish an instant center about which said baffle moves when responding to changing windrow thickness, with said instant center being forward of said baffle.

3. The combination, as defined in claim 1, wherein, said suspension arrangement includes a multi-bar linkage coupled between said baffle and said frame such that said baffle is located in trailing relationship to said multi-bar linkage.

4. The combination, as defined in claim 1, wherein said suspension arrangement includes a multi-bar linkage coupled between said baffle and frame such that said baffle is located in leading relationship to said multi-bar linkage.

5. In combination with a crop processing implement including a main frame supported on ground wheels and a crop windrow pick-up coupled to the main frame for pivoting vertically and having tines supported for sweeping a path that carries them into engagement with a crop windrow for elevating the windrow into the implement for further processing, a crop control arrangement including a transverse baffle arrangement including a baffle located ahead of said path for engaging the top of a windrow being picked up, a suspension arrangement coupled between said baffle and said frame for maintaining said baffle at a minimum clearance from said path while permitting said baffle to move up and down in response to variations in thickness of said windrow, the improvement comprising: said suspension arrangement including a multi-bar linkage coupled between said baffle and said frame so as to cause said baffle to move upwardly and forwardly relative to said path in response to increasing windrow thickness; said baffle being defined by a tubular roller having a central axis, a pair of bearing housings respectively being fixed along said axis within opposite ends of said roller, a pair of support shafts being respectively received for rotation in said pair of bearing housings and respectively projecting outwardly from said opposite ends of said roller, and a pair of couplers respectively fixing said shafts to said multi-bar linkage.

6. The combination, as defined in claim 5, wherein said pair of couplers are respectively mounted to each of said shafts for limited vertical movement relative to an associated one of said shafts and having an outer end mounted to said multi-bar linkage, whereby each end of said roller may rise and fall a limited amount relative to an opposite end without causing binding loads to be applied to said multi-bar linkage.

7. The combination, as defined in claim 6, wherein each of said pair of couplers is cylindrical and includes a cavity extending axially from one end of the coupler and being substantially elliptical in cross section and oriented so as to have a major cross sectional dimension disposed vertically; said pair of shafts each projecting axially into the cavity of an associated one of said pair of couplers; and each coupler including a cross bore disposed along a minor cross sectional dimension of said cavity; said pair of shafts respectively including cross bores aligned with the cross bores in said pair of couplers, and a coupling pin being received within the aligned cross bores in each of the pair of couplers and pair of shafts.

8. The combination, as defined in claim 5 wherein a pair of end plates respectively engage opposite ends of said roller and have outer peripheries respectively extending radially beyond an outer perimeter of said roller; and a plurality of tie rods extending through said end plates and clamping them against said opposite ends of said roller, with said tie rods lying along an exterior surface of said roller.

9. The combination, as defined in claim 1, and further including a crop hold-down assembly mounted to said multi-bar linkage at a rear location of said baffle assembly.

10. The combination, as defined in claim 9, wherein said hold-down assembly includes a crop compressing arrangement projecting rearwardly over said path.

11. The combination, as defined in claim 10, wherein said crop compressing arrangement comprises a plurality of compressor rods spaced transversely from each other and projecting rearwardly over said path; and said compressor rods each being located along a line extending substantially tangential to an upper surface of said baffle assembly.

12. The combination, as defined in claim 10, wherein said crop processing implement is a large round baler including a baling chamber having a crop inlet and defined in part by bale chamber element located adjacent said inlet; said crop compressing arrangement having a rear end region located at said inlet in a space adjacent said bale chamber element; and said multi-bar linkage being constructed and so located relative to said compressor rods that said rear end region of said compressing arrangement remain in said space and out of contact with said bale chamber element throughout an entire of range of vertical movement of said multi-bar linkage during baling operation.

13. The combination, as defined in claim 1, wherein suspension arrangement further includes a pair of flexible elements respectively located at opposite sides of said suspension arrangement, with each flexible element being mounted between said baffle arrangement and main frame.

14. The combination, as defined in claim 13, wherein said flexible elements are vertically flexible, but are relatively stiff in a sideways direction so as to resist sideways movement of said baffle assembly.

15. The combination, as defined in claim 1, wherein a counter balance arrangement is coupled between said frame and said suspension arrangement for exerting a lifting force on said suspension arrangement.

16. The combination, as defined in claim 15, wherein said counter balance arrangement includes at least one elastic element.

17. The combination, as defined in claim 16, wherein said elastic element is a spring.

18. In combination with a crop processing implement including a main frame supported on ground wheels and a crop windrow pick-up coupled to the main frame having tines supported for sweeping a path that carries them into engagement with a crop windrow for elevating the windrow into the implement for further processing, a crop control arrangement including a transverse baffle arrangement including a baffle located ahead of said path for engaging the top of a windrow being picked up, a suspension arrangement coupled between said baffle and said frame for maintaining said baffle at a minimum clearance from said path while permitting said baffle to move up and down in response to variations in thickness of said windrow, the improvement comprising: said suspension arrangement including a multi-bar linkage, with said multi-bar linkage being defined by upper and lower pairs of links having forward ends respectively pivotally coupled to said frame for pivoting about respective upper and lower transverse axes; and a counter balance arrangement being defined by at least one coil torsion spring having coils arranged about one of said upper and lower axes and having opposite ends engaged with respective stops provided on said frame and multi-bar linkage so as to exert a lifting on said multi-bar linkage.

19. The combination, as defined in claim 18, wherein the lifting force exerted by said coil torsion spring is adjustable by adjusting one of said stops.

20. In combination with a crop processing implement including a main frame supported on ground wheels and a crop windrow pick-up coupled to the main frame having tines supported for sweeping a path that carries them into engagement with a crop windrow for elevating the windrow into the implement for further processing, a crop control arrangement including a transverse baffle arrangement including a baffle located ahead of said path for engaging the top of a windrow being picked up, a suspension arrangement coupled between said baffle and said frame for maintaining said baffle at a minimum clearance from said path while permitting said baffle to move up and down in response to variations in thickness of said windrow, the improvement comprising: said suspension arrangement including a multi-bar linkage, with said multi-bar linkage being defined by upper and lower pairs of links having forward ends respectively pivotally coupled to said frame for pivoting about respective upper and lower transverse axes; said multi-bar linkage further being defined by a lift linkage arrangement coupled between one of said upper and lower pairs of links and said pick-up, with said lift linkage arrangement being constructed for sensing changes in position of said pick-up and providing an input to said one of said pair of upper and lower links so as to cause said upper and lower pairs of links to raise in response to upward movement of said pick-up, and in this way cause said baffle to move upwardly and forwardly relative to said path.

21. The combination, as defined in claim 20, wherein said at least one of said upper and lower pairs of links includes at least one alternate connecting location for said lift linkage arrangement, whereby said lift linkage arrangement may be attached to said alternate connecting location so as to change a lifting characteristic of said lifting linkage.

22. The combination, as defined in claim 20, wherein said pick-up further includes a pair of flare sheets respectively mounted at opposite ends of said pick-up for pivoting about an axis of rotation of said tine reel; each of said flare sheets having an upper forward portion extending next to a vertical section of said main frame; each said vertical section containing a fore-and-aft extending frame slot; a fastener positioned in each frame slot for movement therein and each extending through a adjacent one of said flare sheets; said multi-bar linkage including upper and lower pairs of links located at each of opposite ends of said baffle and having forward ends respectively pivotally coupled to said main frame for pivoting about upper and lower transverse axes; one of said upper and lower pairs of links being respectively being provided with a pair of ears projecting upwardly and to the rear from an associated one of said upper and lower transverse axes; and said suspension arrangement including a pair of lift links having respective forward ends pivotally attached to said pair of ears, and having respective rear sections containing respective elongate link slots overlapping said pair of elongate frame slots; and said fastener in each of said flare sheets also being received in an adjacent link slot; and said lift links, link slots and frame slots being so located relative to said axis of rotation of said tine reel that a lifting force is exerted on said multi-bar linkage by: said lift link when said axis of rotation has moved a preselected distance vertically relative to said pair of fasteners.

23. The combination, as defined in claim 22, wherein at least one alternate location for link attachment is provided by each of said ears, whereby said lift links may be attached to said ears at said alternate locations of attachment so as to change a lifting characteristic of said lift links.

* * * * *